(12) United States Patent
Free et al.

(10) Patent No.: US 8,955,294 B2
(45) Date of Patent: Feb. 17, 2015

(54) CONTINUOUS BAGGING PROCESSES AND SYSTEMS

(75) Inventors: Dwayne Free, Kevil, KY (US); Duane Boothe, Clifton Forge, VA (US); Melinda Kay, Clifton Forge, VA (US); Jeff Rose, Clifton Forge, VA (US); Ed Beckner, Roanoke, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 219 days.

(21) Appl. No.: 13/202,909

(22) PCT Filed: Feb. 24, 2010

(86) PCT No.: PCT/US2010/025255
§ 371 (c)(1),
(2), (4) Date: Aug. 23, 2011

(87) PCT Pub. No.: WO2010/099215
PCT Pub. Date: Sep. 2, 2010

(65) Prior Publication Data
US 2012/0000161 A1    Jan. 5, 2012

Related U.S. Application Data

(60) Provisional application No. 61/155,045, filed on Feb. 24, 2009, provisional application No. 61/219,164, filed on Jun. 22, 2009.

(51) Int. Cl.
*B65B 1/40* (2006.01)
*B65B 9/20* (2012.01)
(Continued)

(52) U.S. Cl.
CPC . *B65B 1/40* (2013.01); *B65B 63/02* (2013.01); *B65B 1/46* (2013.01); *B65B 9/20* (2013.01); *B65B 39/04* (2013.01); *B29B 9/065* (2013.01); *B29B 9/16* (2013.01)
USPC ................... 53/428; 53/434; 53/438; 53/459; 53/469; 53/111 R; 53/512; 53/529; 53/127; 53/567; 53/202; 53/503; 53/385.1

(58) Field of Classification Search
CPC .......... B65B 63/08; B65B 63/02; B65B 9/20; B65B 9/15
USPC ........... 53/428, 434, 438, 440, 451, 459, 469, 53/111 R, 512, 529, 127, 551, 567, 575, 53/576, 168, 202, 502, 503, 385.1
See application file for complete search history.

(56) References Cited

U.S. PATENT DOCUMENTS 2,113,636 A * 4/1938 Vogt ................................ 53/451
2,618,814 A * 11/1952 Paton et al. ..................... 53/575
(Continued)

FOREIGN PATENT DOCUMENTS

CN    1063084 A    7/1992
CN    1528844 A    9/2004
(Continued)

OTHER PUBLICATIONS

Notification of First Office Action dated Oct. 26, 2012 for related Chinese Application No. 2010800103366, 12 pages.
(Continued)

*Primary Examiner* — Stephen F Gerrity
(74) *Attorney, Agent, or Firm* — Troutman Sanders LLP; Ryan A. Schneider; Benjamin C. Wiles

(57) ABSTRACT

Disclosed herein are processes for continuously bagging pellets. The pellets can be formed from a tacky and/or polymer-containing formulation. Other embodiments relate to systems for continuously bagging pellets. Still other embodiments related the individual components of the processes and systems for continuously bagging pellets.

26 Claims, 8 Drawing Sheets

(51) Int. Cl.
*B65B 63/02* (2006.01)
*B65B 1/46* (2006.01)
*B65B 39/04* (2006.01)
*B29B 9/16* (2006.01)
*B29B 9/06* (2006.01)

(56) References Cited

U.S. PATENT DOCUMENTS

| | | | | |
|---|---|---|---|---|
| 2,727,809 A * | 12/1955 | Lust | | 422/270 |
| 2,927,763 A * | 3/1960 | Overman | | 177/98 |
| 3,040,490 A * | 6/1962 | Virta | | 53/434 |
| 3,202,084 A * | 8/1965 | Hale et al. | | 53/122 |
| 3,419,414 A * | 12/1968 | Marks | | 428/601 |
| 3,436,243 A * | 4/1969 | Kruger | | 428/404 |
| 3,458,045 A | 7/1969 | Dudley | | |
| 3,521,426 A * | 7/1970 | Evins | | 53/502 |
| 3,707,172 A * | 12/1972 | Obara | | 53/502 |
| 3,892,834 A * | 7/1975 | Pritchard | | 264/142 |
| 3,989,853 A | 11/1976 | Forkner | | |
| 4,117,645 A * | 10/1978 | Phillips | | 53/431 |
| 4,123,207 A | 10/1978 | Dudley | | |
| 4,218,323 A | 8/1980 | McCracken | | |
| 4,251,198 A | 2/1981 | Altenburg | | |
| 4,447,325 A | 5/1984 | Pauley | | |
| 4,500,271 A | 2/1985 | Smith | | |
| 4,565,015 A | 1/1986 | Hundley, III | | |
| 4,621,966 A | 11/1986 | Luperti et al. | | |
| 4,686,937 A * | 8/1987 | Rosenfeld | | 119/173 |
| 4,688,371 A * | 8/1987 | Hecht | | 53/502 |
| 4,728,276 A | 3/1988 | Pauley et al. | | |
| 4,738,287 A * | 4/1988 | Klinkel | | 53/511 |
| 4,872,493 A * | 10/1989 | Everman | | 141/59 |
| 4,888,990 A | 12/1989 | Bryan et al. | | |
| 4,896,435 A | 1/1990 | Spangler, Jr. | | |
| 4,964,259 A | 10/1990 | Ylvisaker et al. | | |
| 5,041,251 A * | 8/1991 | McCoskey et al. | | 264/130 |
| 5,059,103 A | 10/1991 | Bruckmann et al. | | |
| 5,077,958 A * | 1/1992 | Peppard et al. | | 53/570 |
| 5,265,347 A | 11/1993 | Woodson et al. | | |
| 5,403,176 A | 4/1995 | Bruckmann et al. | | |
| 5,531,845 A | 7/1996 | Flanigan et al. | | |
| 5,624,688 A | 4/1997 | Adams et al. | | |
| 5,626,004 A * | 5/1997 | Gates et al. | | 53/459 |
| 5,638,606 A | 6/1997 | Bryan et al. | | |
| 5,638,660 A | 6/1997 | Kuo | | |
| 5,653,872 A * | 8/1997 | Cohan | | 210/252 |
| 5,869,555 A | 2/1999 | Simmons et al. | | |
| RE36,177 E | 4/1999 | Rouyer et al. | | |
| 5,895,617 A | 4/1999 | Mizuguchi et al. | | |
| 5,927,049 A * | 7/1999 | Simard | | 53/428 |
| 5,942,569 A | 8/1999 | Simmons et al. | | |
| 6,116,001 A * | 9/2000 | Kammler et al. | | 53/551 |
| 6,120,899 A | 9/2000 | Cameron et al. | | |
| 6,138,375 A | 10/2000 | Humphries, II et al. | | |
| 6,237,244 B1 | 5/2001 | Bryan et al. | | |
| 6,238,732 B1 | 5/2001 | Cameron et al. | | |
| 6,332,765 B1 | 12/2001 | Spelleken | | |
| 6,551,087 B1 | 4/2003 | Martin | | |
| 6,623,829 B1 * | 9/2003 | Fuss et al. | | 428/71 |
| 6,739,457 B2 | 5/2004 | Humphries, II et al. | | |
| 6,793,473 B1 | 9/2004 | Fridley | | |
| 6,807,748 B2 | 10/2004 | Bryan et al. | | |
| 6,824,371 B2 | 11/2004 | Smit | | |
| 6,925,741 B2 | 8/2005 | Eloo et al. | | |
| 7,024,794 B1 | 4/2006 | Mynes | | |
| 7,033,152 B2 | 4/2006 | Eloo et al. | | |
| 7,171,762 B2 * | 2/2007 | Roberts et al. | | 34/312 |
| 7,172,397 B2 | 2/2007 | Fridley | | |
| 7,267,540 B2 | 9/2007 | Fridley et al. | | |
| 7,318,719 B2 | 1/2008 | Fridley | | |
| 7,402,034 B2 | 7/2008 | Fridley | | |
| 2002/0014019 A1 * | 2/2002 | Hultsch | | 34/184 |
| 2004/0074800 A1 * | 4/2004 | Harwell et al. | | 206/484 |
| 2004/0106723 A1 * | 6/2004 | Yang et al. | | 524/570 |
| 2004/0209082 A1 * | 10/2004 | Lee et al. | | 428/407 |
| 2005/0217754 A1 | 10/2005 | Gill et al. | | |
| 2006/0093764 A1 * | 5/2006 | Mehta et al. | | 428/35.2 |
| 2006/0130353 A1 | 6/2006 | Eloo | | |
| 2007/0132134 A1 | 6/2007 | Eloo | | |
| 2007/0284771 A1 | 12/2007 | Boothe et al. | | |
| 2007/0294982 A1 | 12/2007 | Knoke et al. | | |
| 2008/0071061 A1 | 3/2008 | Bruckmann | | |
| 2009/0110833 A1 | 4/2009 | Wright et al. | | |
| 2009/0203840 A1 | 8/2009 | Martin et al. | | |

FOREIGN PATENT DOCUMENTS

| | | | | |
|---|---|---|---|---|
| DE | 1953741 A1 | 5/1971 | | |
| DE | 2248046 A1 | 4/1974 | | |
| DE | 2819443 A1 | 11/1979 | | |
| DE | 3234065 A1 | 4/1983 | | |
| DE | 3138222 C1 | 5/1983 | | |
| DE | 3327289 A1 | 2/1985 | | |
| DE | 3640520 A1 * | 6/1988 | | B65B 1/32 |
| DE | 4330078 A1 | 3/1994 | | |
| DE | 9320744 U1 | 1/1995 | | |
| DE | 19708988 A1 | 10/1997 | | |
| EP | 0051484 | 5/1982 | | |
| EP | 0051484 A1 | 5/1982 | | |
| EP | 1123480 A1 | 10/1998 | | |
| EP | 1033545 A1 | 9/2000 | | |
| EP | 1602888 A2 | 12/2005 | | |
| EP | 1647788 A2 | 4/2006 | | |
| EP | 1650516 | 4/2006 | | |
| EP | 1650516 A2 | 4/2006 | | |
| EP | 2008784 | 12/2008 | | |
| EP | 2008784 A1 | 12/2008 | | |
| GB | 2280187 | 1/1995 | | |
| GB | 2280187 A | 1/1995 | | |
| JP | 52013995 A * | 2/1977 | | B65B 45/00 |
| JP | S52-068581 A | 5/1977 | | |
| JP | S60-191940 A | 12/1985 | | |
| JP | H01-288408 A | 11/1989 | | |
| JP | H04-294718 A | 10/1992 | | |
| JP | 05032232 A * | 2/1993 | | B65B 51/08 |
| JP | H11-348902 A | 12/1999 | | |
| JP | 2004-331095 A | 11/2004 | | |
| WO | 2006069022 A1 | 6/2006 | | |
| WO | 2006076331 | 7/2006 | | |
| WO | 2007064580 A2 | 6/2007 | | |
| WO | WO 2007064580 A2 * | 6/2007 | | B29C 47/12 |
| WO | 2007103509 A2 | 9/2007 | | |
| WO | 2007123931 A1 | 11/2007 | | |
| WO | 2008113560 A2 | 9/2008 | | |

OTHER PUBLICATIONS

PCT International Search Report dated Jan. 19, 2011 for related PCT Patent Application No. PCT/US2010/025255, 5 pages.
Supplementary European Search Report for dated Dec. 3, 2013 for related European Patent Application No. EP10746776.3, 9 pages.
Office Action in related Mexican Application No. MX/a/2011/008929 dated May 28, 2014, 3 pages.
Office Action in related Japanese Application No. 2011-551314 dated Feb. 4, 2014, 2 pages.

* cited by examiner

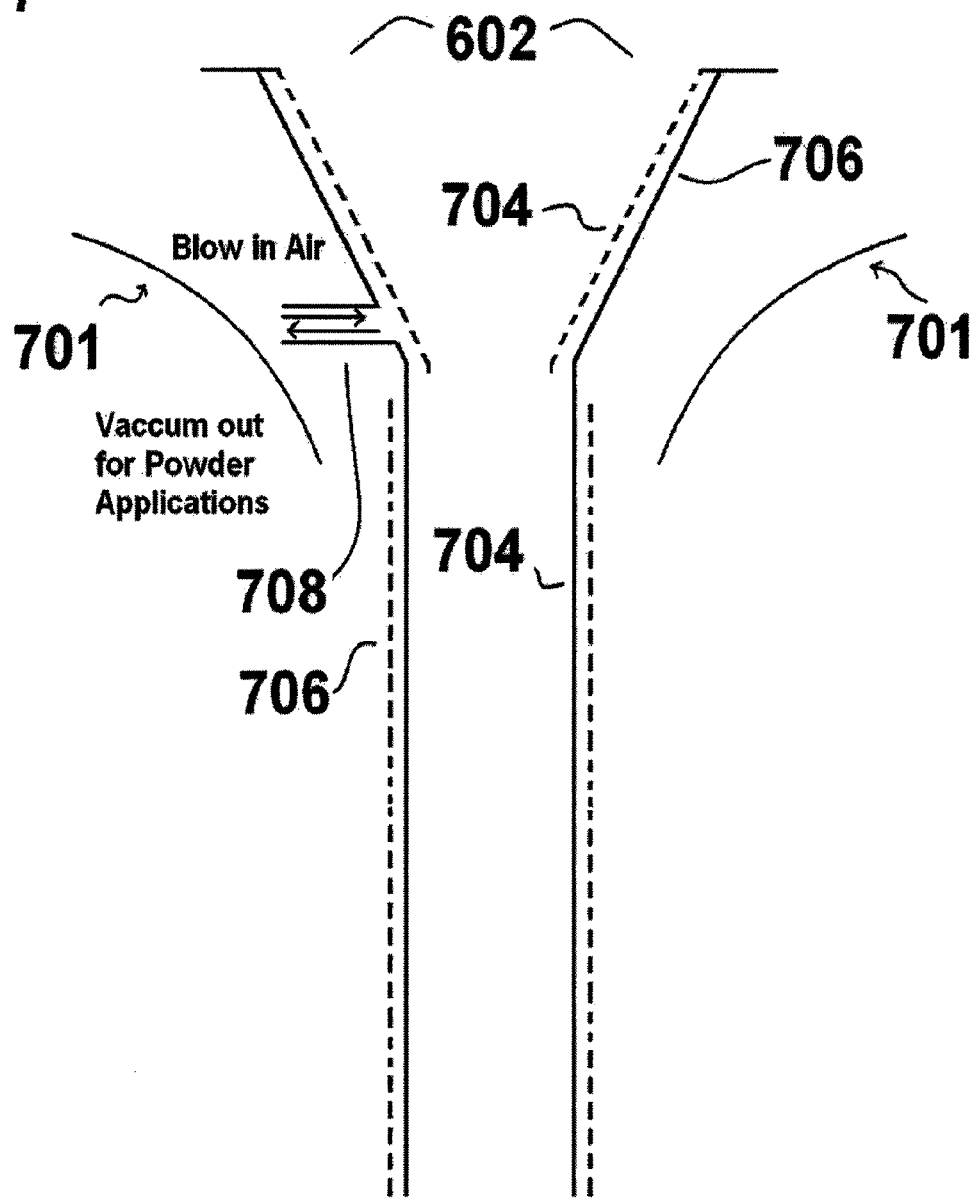

CONTINUOUS BAGGING PROCESSES AND SYSTEMS

CROSS-REFERENCE TO RELATED APPLICATIONS

The present application claims the benefit of International Patent Application Serial Number PCT/US2010/025255, filed 24 Feb. 2010, which claims the benefit of U.S. Provisional Patent Application Ser. No. 61/155,045, filed 24 Feb. 2009, and U.S. Provisional Patent Application Ser. No. 61/219,164, filed 22 Jun. 2009, all of which are hereby incorporated by reference in their entirety as if fully set forth below.

BACKGROUND OF THE INVENTION

1. Field of the Invention

The various embodiments of the present invention generally relate to processes and systems for bagging pellets. More specifically, the various embodiments of the present invention relate to improvements in the processes of extruding, pelletizing, drying, and bagging of meltable and/or processable polymers, specifically those that are tacky, so as to provide processes where the meltable and/or processable polymers are extruded, pelletized, dried, and bagged continuously.

2. Description of the Prior Art

The generally independent processes of, and equipment for use in, extrusion, pelletization, drying, and bagging of polymeric material are known and have been used in various applications. Over time, the demand for processes and equipment capable of efficiently extruding, pelletizing, drying, and bagging tacky polymers (e.g., hot melt adhesives and hot melt pressure sensitive adhesives) has increased. Yet, the prior art remains silent as to a process where such materials are extruded, pelletized, dried, and bagged continuously (i.e., where such material is pelletized and flows continuously throughout the process until it is bagged).

German Patent DE 22 48 046 discloses the confectioning and packaging of thermoplastic adhesives. According to the teachings of this patent, which are widely used, a hot melt adhesive is squeeze-cut into roughly pillow-shaped pieces, the pieces are subsequently cooled (and thus solidified), are then put into sacks, cartons, and like containers for packaging. To reduce the tendency of the individual pillows to stick or to adhere to each other, an anti-stick substance (e.g., a wax or a polymer) can be used to coat them, as taught in German Patent DE 33 27 289. Another method for packaging adhesive compositions includes wrapping or placing larger portions of the adhesive in a plastic film material, such as thick polyethylene.

These existing packaging techniques suffer from drawbacks. Specifically, the adhesive composition must be removed from the packaging material prior to use, thereby requires further handling of the material. In addition, the packaging material must be discarded after emptying, which leads to material waste and expenditures for disposal of the used packaging material.

German Patents DE 31 38 22 and DE 32 34 065 disclose coating the circumference of elongated hot-melt portions with a thin polyolefin film in order to prevent sticking problems when winding these string-like portions unto each other. The portions are subsequently cut to make cartridge of cartouche fillings, whereby the film stays on the circumference and is molten and applied together with the adhesive.

The above-mentioned references relate to the concept of preventing individual hot-melt portions or pieces from sticking by individually coating them with a polymeric film. Such processes would not be practical for mass-producing thermoplastic adhesive composition pillows, since they would be very expensive to implement on an industrial scale, the desired adhesive composition would be greatly diluted with the coating film material, and the squeeze-cutting step does not allow for a complete enclosure of the individual pillows by the film.

Therefore, a need arose for a method of packaging one or more pieces of adhesive compositions that would reduce the amount of handling of the adhesive. Such a method is disclosed in U.S. Reissued Pat. No. Re. 36,177. This reference discloses a packaging material that is capable of being melted with the adhesive composition without adversely affecting the properties of the adhesive composition. That is, the packaging composition is blendable in the melted adhesive, and does not result in a deteriorated adhesive once blended therein. U.S. Reissued Pat. No. Re. 36,177, however, remains silent as to any processing conditions that are necessary to continuously bag such pelletized compositions.

Other methods for packaging tacky polymers have been developed and are widely known to those skilled in the art. One such method requires that the material be poured into a container (e.g., a plastic bag or specially designed cardboard box) in a molten state. Regardless of whether the melt is poured into a bag or a box, it must be cooled. To cool the molten polymer, which has been poured into a compatible bag, the polymer is placed into a flowing "bath" of cooling liquid. Such baths can take up a considerable amount of space and require a significant amount of energy to operate.

To package molten polymer in a box, prior art methods entail pouring the molten material into a specially designed box, such as a cardboard box with coated interior walls. Such boxes can be costly, and may only be used once. This method of boxing the molten material is not practical for a variety of reasons, including the polymeric material is exposed to contaminants, the overall method is environmentally unfriendly, it is difficult to remove the polymeric material from the box, and there is a possibility of breaks and/or leaks in the boxes during handling. Adding to the cost and inefficiency of such processes is the manner in which the melt is cooled. By placing the filled boxes on rolling trays and cooling them in large refrigerators, manufacturers are able to cool the melt, but at the expense of high electricity costs. Special release paper and plastic molds may also be used to package the material, but the paper can be costly and, in some cases, may only be used once as it must be torn to obtain the material which it surrounds. By packaging the material in special release paper it must first be cooled by way of the inefficient refrigerator method described above. Additionally, polymeric materials that are packaged in plastic molds are also cooled in a related manner.

In addition to bagging and packaging processes, the extrusion, pelletization, and drying of polymeric materials have been described elsewhere.

For example dryer equipment has been used by the assignee of the present application for many years as demonstrated in prior art disclosures including, for example, U.S. Pat. Nos. 3,458,045, 4,218,323, 4,447,325, 4,565,015, 4,896, 435, 5,265,347, 5,638,606, 6,138,375, 6,237,244, 6,739,457, 6,807,748, 7,024,794, and 7,171,762; U.S. Patent Application Publication No. 2006/0130353; German Patents and Applications DE 19 53 741, DE 28 19 443, DE 43 30 078, DE 93 20 744, and DE 197 08 988; and European Patents EP 1 033 545, EP 1 123 480, EP 1 602 888, EP 1 647 788, EP 1 650 516, and EP 1 830 963.

Similarly, pelletizing equipment has been used by the assignee of the present application for many years as demonstrated in prior art disclosures including, for example, U.S. Pat. Nos. 4,123,207, 4,251,198, 4,500,271, 4,728,276, 4,888, 990, 5,059,103, 5,624,688, 6,332,765, 6,551,087, 6,793,473, 6,925,741, 7,033,152, 7,172,397, 7,267,540, and 7,318,719. Similarly, die equipment and designs have been used by the assignee of the present application for many years as demonstrated in the prior art disclosures including, for example, U.S. Pat. Nos. 4,621,996, 5,403,176, 6,824,371, and 7,402, 034.

Similarly, other methods and apparatuses have been developed and used by the assignee of the present application for many years as demonstrated in prior art disclosures including, for example, U.S. Patent Application Publication Nos. 2007/132134, 2009/0110833, 2007/0284771, U.S. patent application Ser. No. 12/029,963, International Patent Application Publication Nos. WO 2007/064580 and WO 2007/103509, and EP Patent Application No. EP 012 352.6. All of the above referenced patents and applications are all owned by the assignee and are included herein by way of reference in their entirety.

BRIEF SUMMARY

Briefly, the various embodiments of the present invention include several improvements over existing individual processes and apparatuses, resulting in efficient continuous bagging processes and systems.

These continuous bagging processes and systems can be used on any type of polymer-containing formulation. These processes and systems can also be used on any type of tacky or sticky formulation. In particular, these processes and systems are beneficial for use with tacky or sticky polymer-containing formulations. As used herein, the terms "tacky" or "sticky", when referring to a formulation, encompasses those formulations that, when in solid form (e.g., pellet, particle, powder, or the like), are soft at ambient temperature and can at least partially adhere to other items in which the solid form comes into contact. A few illustrative examples of tacky or sticky formulations, whether polymeric or not, include adhesives such as hot melt adhesives (HMAs), pressure sensitive adhesives (PSAs), hot melt pressure sensitive adhesives (HMPSAs), and the like; sealants; bitumen or tarmac-containing formulations, including without limitation asphalt, and the like; natural or synthetic rubbers; and precursors to any of the foregoing compositions such as polyesters, polyamides, and the like.

Owing to the tackiness or stickiness of these meltable and processable tacky and/or polymer-containing formulations, it has been found that difficulties arise when extruding, pelletizing, drying, and bagging such formulations. One such difficulty has been found to exist immediately after the pellets exit a dryer, such as a centrifugal dryer from the pellet outlet. The exiting pellets are exhausted with such a high velocity that, when coupled with their tacky or sticky nature, they tend to stick to many items in which they come into contact. In existing systems, a major hang-up point for the pellets has been the one or more pellet diverter valves, which are used to direct the flow of the pellets between various areas of collection (e.g., a waste container, collection for packaging, or the like).

In the packaging of the tacky and/or polymer-containing materials (and, in this case, the bagging of such materials), it has always been desirable to regulate the amount of material being put into the package so as to meet a specification and minimize material waste. Existing bagging processes are "non-continuous" in that the tacky and/or polymeric material, after exiting the dewatering and/or drying phase, is either interrupted and/or stopped prior to bagging so that it may accumulate, for example, in a hopper, until the desired weight is obtained. Once the desired weight is obtained, the material is released and bagged. Such methods, while effective for some materials, are not for formulations that are highly tacky or sticky. If the above-described methods are used in conjunction with highly tacky or sticky formulations, the formulation may never become bagged because the pellets could stick together and form an agglomerate within the hopper, which would prevent further processing.

Accordingly, one aspect of the present invention includes providing a continuous process in which pellets flow freely from the time they are pelletized and exit a dryer until they are disposed in a bag for packaging.

Another aspect of the present invention includes providing a continuous process in which molten material is pelletized, cooled, at least partially solidified, and dried prior to being packaged in a compatible bag.

Another aspect of the present invention includes providing a continuous process in which molten material may be pelletized, cooled, at least partially solidified, dried, and packaged in a compatible bag without or with the use of coatings.

Another aspect of the present invention includes providing a (i.e., at least one) pellet diverter valve that minimizes and/or eliminates the accumulation of pellets therein by providing a proper angle of repose. As used herein, the term "angle of repose" refers to the angle that is supplementary (i.e., two supplementary angles total 180 degrees) to the angle at which a central axis of an outlet of the pellet diverter valve lies with respect to a central axis of the inlet of the pellet diverter valve.

Another aspect of the present invention includes providing a pellet diverter valve with a removable side wall plate that allows for easy access to the interior of the pellet diverter valve so as to facilitate cleaning or repair of the valve. Additionally, level sensors can optionally be installed to allow alarm functionality in the event any build up is detected on the pellet diverter valve(s). These sensors can alert the operator of a malfunction, can activate a divert function, and/or can initiate a shutdown sequence.

Another aspect of the present invention includes providing a more efficient bagging process in which pellet hang-up points and pellet agglomerations are reduced with the use of coatings/surface treatments on various pelletizing, drying, diverting, piping or ductwork, and bagging equipment.

Yet another aspect of the invention includes providing a single electronic control mechanism to control various individual bagging units and the pellet diverter valve(s) so as to enhance the continuous bagging of polymeric material.

An additional aspect of the present invention includes providing a vertical form, fill, and seal bagging machine that bags pelletized tacky and/or polymer-containing formulations by providing a vertical seal element with an air cooling element and constant heat. A horizontal end sealing element is embedded in the gripper jaws and is capable of providing both constant and impulse heat, and has an air cooling element. The bagging machine also includes a cutter element that allows for easy removal of the bags, is double sided, and oscillates cutting from both directions to give the blade a longer life. The bagging machine also includes a forming tube for shaping the film into a bag. The forming tube is double walled to minimize the heat coming from the sealing elements on the film and has an optional vacuum port or cooling medium port. The bagging machine also includes static eliminators to reduce and/or eliminate the static created by the unwinding of the film from its roll and the static created when the film is moved along the forming tube, as well as any other static electricity which may be created.

Yet another aspect of the present invention includes providing bagging of pelletized tacky and/or polymer-containing formulations by using a film with a thickness of less than about 40 mil (i.e., one mil is equal to 0.001 inches and 0.025 millimeters), which can also contain anti-foaming agents and other components in its formulation. In some cases, the film can have a thickness of as low as 0.5 mil.

Still yet, another aspect of the present invention allows for the placement of an environmentally controlled enclosure around the bagging units and various duct work. Such an enclosure would help to maintain and optimize the atmospheric conditions, in relation to such things as temperature, contaminants, and moisture.

In one embodiment, a pellet diverter valve has an inverted Y-shape with one inlet, a first and second outlet, and a pellet diverter flap, wherein the pellet diverter valve has an angle of repose between about 15 degrees to about 60 degrees. The pellet diverter valve can further include a detachable wall plate that allows a user to clean and/or repair the inside of the pellet diverter valve. The detachable wall plate can be formed from a transparent material to enable a user to continuously monitor the inside of the pellet diverter valve. The inside surfaces of the pellet diverter valve, including the pellet diverter flap, can be surface treated to reduce abrasion, erosion, corrosion, wear, undesirable adhesion and/or stricture. The pellet diverter valve can be used to direct the flow of pellets into one or more bagging machines for packaging the pellets.

A system for continuously bagging pellets can include material preparation steps such as mixing and melting via processes such as those disclosed in but not limited to WO 2007/103509 and WO 2007/064580, pelletizer(s), dryer(s), bagging machine(s), and pellet diverter valve(s). The system can further include a controller, such as a programmable logic controller (PLC), to control one or more process conditions relating to the operation of the material preparation, extrusion, pelletizer, dryer, pellet diverter valve(s) or diverter valve(s), and bagging machine valve(s).

A process for continuously bagging pellets can include pelletizing a tacky and/or polymer-containing formulation, drying the pellets, diverting the pellets to one or more bagging machines with the pellet diverter valve(s), and bagging the pellets.

According to some embodiments, a system for continuously bagging a tacky and/or polymer-containing formulation material can include a feeding section configured to receive a tacky and/or polymer-containing formulation; a mixing section configured to receive the tacky and/or polymer-containing formulation from the feeding section and mix, melt, and/or blend the tacky and/or polymer-containing formulation; a pelletizing section configured to receive the tacky and/or polymer-containing formulation from the mixing section and pelletize the tacky and/or polymer-containing formulation; a drying section configured to receive the tacky and/or polymer-containing formulation from the pelletizing section and dry the pelletized tacky and/or polymer-containing formulation; a pellet diverter valve comprising an inlet configured to receive an incoming flow of pellets from the drying section, and at least a first and second outlet, each configured to dispense an outgoing flow of pellets; and at least a first and second bagging assembly in communication with at least the first and second outlets, respectively, of the pellet diverter valve, wherein the at least the first and second bagging assemblies alternatingly receive a specific quantity of pellets from the pellet diverter valve to allow continuous bagging of the pellets.

In some cases, at least the first and second bagging assemblies each comprise a vertical forming tube having an input configured to receive an incoming flow of pellets and an output configured to dispense an outgoing flow of pellets; a bagging material placed around and below the forming tube, wherein the bagging material is configured to collect the specific quantity of pellets; and a horizontal sealing mechanism configured to seal the bagging material into individual bags for containing the specific quantity of pellets.

The system for continuously bagging a tacky and/or polymer-containing formulation can also include a programmable logic controller in electrical communication with at least one of the pellet diverter valve or the at least the first and second bagging assemblies, wherein the specific quantity of pellets is controlled by the programmable logic controller.

It is possible for the tacky and/or polymer-containing formulation to be a tacky polymer-containing formulation. Specifically, the tacky polymer-containing formulation can be a hot melt adhesive, a pressure sensitive adhesive, a hot melt pressure sensitive adhesive, or asphalt.

The system for continuously bagging a tacky and/or polymer-containing formulation can also include an internal surface coating disposed on one or more surfaces of the feeding section, mixing section, pelletizing section, drying section, pellet diverter valve, or bagging assemblies that come into contact with the tacky polymeric formulation, wherein the internal surface coating reduces corrosion, erosion, and/or adherence of the tacky polymeric formulation to the one or more surfaces.

According to some embodiments of the present invention, a method for continuously bagging a tacky and/or polymer-containing formulation can include feeding a tacky and/or polymer-containing formulation into a feeding section; mixing, melting, and/or blending the tacky and/or polymer-containing formulation in a mixing section; pelletizing the mixed, melted, and/or blended tacky and/or polymer-containing formulation in a pelletizing section; drying pellets of the tacky and/or polymer-containing formulation in a drying section; continuously diverting a specific quantity of the pellets through one of a first and second outlet of a pellet diverter valve; and collecting the specific quantity of pellets in a bag using a bagging assembly, wherein the bagging assembly is located at the first or second outlets of the pellet diverter valve.

The bagging assembly of the method can include a vertical forming tube having an input configured to receive the specific quantity of pellets and an output configured to dispense the specific quantity of pellets; a bagging material placed around and below the forming tube wherein the bagging material is configured to collect the specific quantity of pellets; and a horizontal sealing mechanism configured to seal the bagging material into individual bags for containing the specific quantity of pellets.

The method for continuously bagging a tacky and/or polymer-containing formulation can further include controlling the specific quantity of pellets using a programmable logic controller in electrical communication with at least one of the pellet diverter valves, the first bagging assembly or second bagging assembly.

As with the systems, it is also possible for the tacky and/or polymer-containing formulation of the method to be a tacky polymer-containing formulation. In some cases, the tacky polymeric formulation can be a hot melt adhesive, a pressure sensitive adhesive, a hot melt pressure sensitive adhesive, or asphalt.

The method for continuously bagging a tacky and/or polymer-containing formulation can also include applying a powder coating to the pellets of the tacky and/or polymer-containing formulation after the drying.

The method for continuously bagging a tacky and/or polymer-containing formulation can also comprise applying a vacuum to the bag to remove air or undesirable materials from the bag.

The method for continuously bagging a tacky and/or polymer-containing formulation can also include perforating the bag.

According to other embodiments of the present invention, a continuous bagging assembly device can include a vertical forming tube having an input configured to receive a specific quantity of pellets and an output configured to dispense the specific quantity of pellets; a bagging material placed around and below the forming tube, wherein the bagging material is configured to collect the specific quantity of pellets; and a horizontal sealing mechanism configured to seal the bagging material into individual bags for containing the specific quantity of pellets.

The continuous bagging assembly device can also include a vacuum configured to remove air or undesirable materials from the individual bags.

The vertical forming tube can also include an interior surface coating configured to reduce adherence of the pellets to the forming tube, corrosion of the forming tube, and/or erosion of the forming tube.

A melting temperature of the bagging material can be less than or equal to about a melting temperature of the pellets.

The continuous bagging assembly device can further comprise a programmable logic controller configured to control the specific quantity of pellets that is contained in the individual bags.

The continuous bagging assembly device can also include a cutting element configured to remove the individual bags from the bagging assembly device.

BRIEF DESCRIPTION OF THE DRAWINGS

FIG. 7 is a schematic illustration of a double walled forming tube in accordance with some embodiments of the present invention.

DETAILED DESCRIPTION

Figure 1:
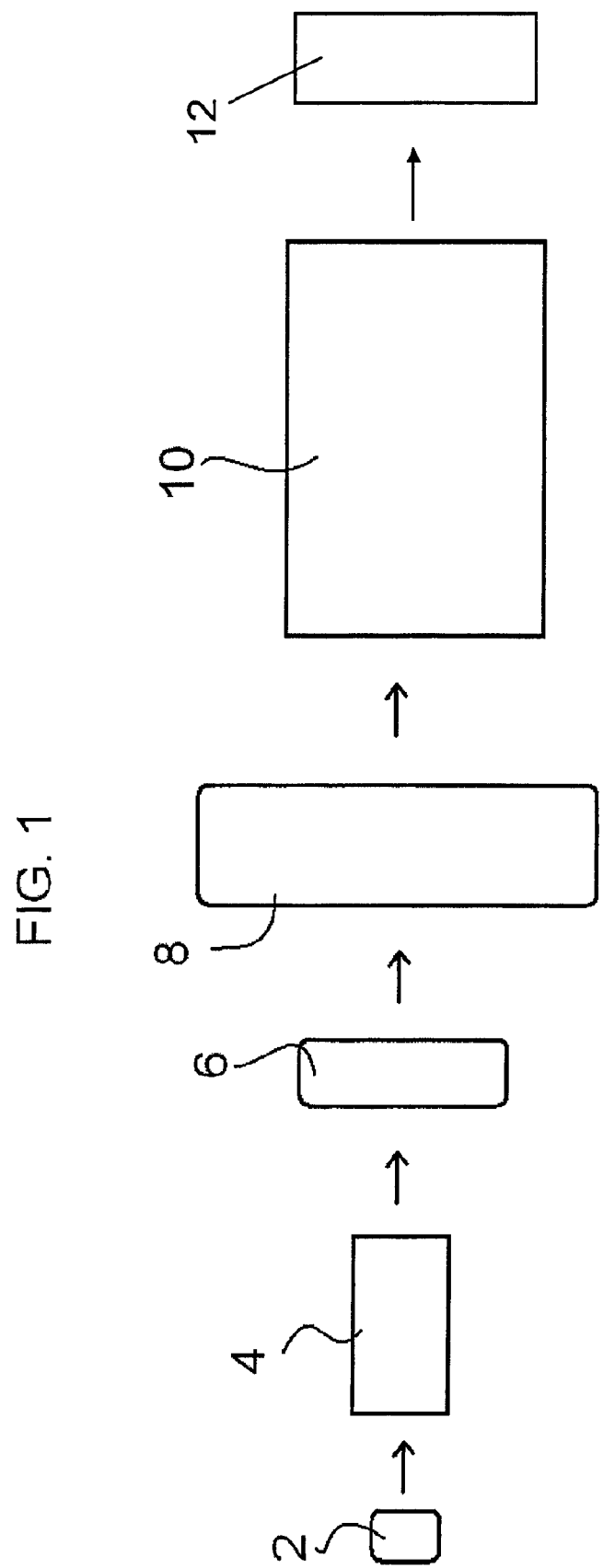
FIG. 1 is a schematic illustration of a continuous bagging process according to some embodiments of the present invention.

Referring now to the figures, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another. Further, the terms "a", "an", and "the" do not denote a limitation of quantity, but rather denote the presence of "at least one" of the referenced item.

An exemplary continuous bagging system is shown schematically in FIG. 1. While the various embodiments of the present invention can involve tacky formulations, polymer-containing formulations, tacky polymer-containing formulations, and the like, for convenience, reference will be made below to tacky polymer-containing formulations. In some instances, such formulations will be referred to as polymeric materials. It should be recognized by those skilled in the art to which this disclosure pertains that the other types of formulations/materials can be interchangeably used in place of the tacky polymer-containing formulations in the description below.

The continuous bagging process shown in FIG. 1 includes a (i.e., at least one) feeding or filling section 2 that provides polymeric material (which, in exemplary embodiments, is a tacky polymer-containing material) into a mixing, melting and/or blending section 4. The mixing section 4 is coupled to a pelletizing section 6 which is subsequently connected via a transport system containing a pellet diverter valve(s), to a dewatering and/or drying device section 8. Upon exiting the drying section 8, pellets are led to a pellet diverting section 10. The pellets ultimately are fed into bagging device section 12.

An exemplary process for continuously bagging the tacky polymer-containing material generally includes feeding the tacky polymeric material from the feeding or filling section 2 to the mixing, melting, and/or blending section 4. Next, the tacky polymeric material is mixed, melted, and/or blended. This step can include extruding the tacky polymeric material. A further processing step includes pelletizing the material (i.e., in pelletizing section 6). After pelletization, the pellets are sent to a dewatering and/or drying device 8, via a transport system, where they are dried or dewatered. Upon drying, the pellets exit drying section 8 and enter pellet diverting section 10. Finally, the dried and diverted pellets are sent to the bagging section 12, where they are packaged for subsequent use.

Referring to the system shown in FIG. 1, the feeding or filling section 2 and the mixing, melting and/or blending section 4 can make use of any equipment or methods known by those skilled in the art to which this disclosure pertains. For illustrative convenience, however, reference is made to a feeding or filling section 2 and a mixing, melting and/or blending section 4 from which would sequentially follow a booster pump, melt pump, screen changer, heat exchanger, and polymer diverter valve(s) with side discharge. International Patent Application Publication Nos. WO 2007/123931 and WO 2007/064580 describe the use of such systems in greater detail. These references are incorporated herein by reference in their entireties as if fully set forth below. It will be clear, however, to those skilled in the art to which this disclosure pertains as to how other components can be substituted for those described herein without undue efforts.

In addition, while the various embodiments of the present invention relating to the system shown in FIG. 1 contemplate other types of pelletization, drying, and bagging equipment or methods, for illustrative convenience only these embodiments will be described as part of a system including an underwater pelletizer, centrifugal dryer, and a "vertical form, fill, and seal" bagging machine. For the sake of brevity (i.e., to minimize excessive text describing each of the various individual types of pelletization, drying, and bagging equipment and method steps, as well as combinations thereof, that can be implemented into the systems and methods described herein), it is to be understood that, by extension, any reference to underwater pelletizers, centrifugal dryers, and bagging machines is intended to include other types of pelletizers, dryers and bagging machines, respectively, whether used as substitutes for, or in conjunction with, those items described herein. It will be clear to those skilled in the art to which this disclosure pertains as to how such other components and process steps can be substituted for those described herein without undue efforts.

Further, while this disclosure might highlight only certain components of the underwater pelletizers, centrifugal dryers, and/or bagging machines that can be implemented in the continuous bagging systems and processes of the present invention, more detailed descriptions of the specific components of such equipment, and the processes for using such equipment, can be found in the various U.S. and foreign patents and patent applications of the assignee of the present application listed in the background section of the present application. Each of these patents and patent applications are incorporated by reference in their entireties as if fully set forth below.

Referring again to the continuous bagging system shown in FIG. 1, fittingly attached to, and just downstream of, the polymer diverter valve(s) of the mixing, melting and/or blending section 4 is pelletizing section 6. To elaborate briefly, the other types of pelletizers that can be used in the systems and processes described herein include prillers, rotoformers, hot face pelletizers, strand pelletizers, water-ring pelletizers, and underwater pelletizers.

A bypass loop (not shown) can be used as part of pelletizing section 6. Transportation fluid can be obtained from a reservoir (not shown) or other sources, and is transported toward a transport fluid box or waterbox (not shown) a through pump (not shown) that can be of a design and/or configuration to provide sufficient fluid flow into and through an optional heat exchanger (not shown) and a transport pipe to and into the bypass loop. The heat exchanger similarly can be of a design of suitable capacity to maintain the temperature of the transport fluid at a level appropriately suitable to maintain the temperature of the pellets being formed such that pellet geometry, throughput, and pellet quality are satisfactory without tailing, and where wrap-around of molten material on the cutter or cutting face, agglomeration of pellets, cavitation, and/or accumulation of pellets in the transport fluid box or waterbox are maximally avoided.

The temperature, flow rate, and the composition of the transport fluid will vary with the material or formulation being processed. Transport medium/fluid temperatures are preferably maintained at least approximately 20° C. below the melting temperature of the polymer. For tacky or sticky polymers, the transport medium/fluid is generally maintained at a temperature between approximately 30° C. to approximately 250° C. below the melt temperature of the polymer, which will often be below 10° C. so as to minimize adhesion of the pellets to any surfaces of the components of the system and/or agglomeration of the pellets to one another. In some instances, the transport fluid temperature is maintained between approximately −100° C. to approximately 90° C., and also can be maintained between approximately −50° C. to approximately 40° C., and can even be maintained between approximately −20° C. to approximately 10° C. Depending on the desired temperature of the transport fluid/medium, the transport fluid/medium can be water, an alcohol (including mono-hydroxy alcohols, diols, triols, and higher order alcohols), and/or another liquid that has a freezing point below that which is desired for use during the processing. Mixtures of different transport fluids can also be used. For example, in certain embodiments, a mixture of water and a glycol can be used as the transport fluid.

Additionally, processing aids, flow modifiers, surface modifiers, coatings, surface treatments (e.g., anti-static compositions), and various other additives known to those skilled in the art can be accommodated in the transport fluid. These optional additives can be used to depress the freezing point of the transport fluid so as to extend the range of temperatures that a particular transport fluid composition can be used. U.S. Pat. Nos. 6,120,899, 6,238,732, 5,869,555, and 5,942,569; and International Patent Application Publication No. WO 2007/0103509 describe the use of different transport fluids in conjunction with some of these additives in greater detail. These references are incorporated herein by reference in their entireties as if fully set forth below.

Piping, valving, and bypass components should be of suitable construction to withstand the temperature, chemical composition, abrasivity, corrosivity, and/or any pressure requisite to the proper transport of the pellet-transport fluid mixture. Any pressure required by the system is determined by the vertical and/or horizontal transport distance, pressure level needed to suppress unwanted volatilization of components or premature expansion, pellet-transport fluid slurry flow through valving, coarse screening, ancillary process and/or monitoring equipment. Pellet-to-transport fluid ratios should similarly be of varying proportions to be satisfactorily effective in eliminating or alleviating the above-mentioned complicating circumstances (e.g., pellet accumulation, flow blockage or obstruction, and agglomeration). Piping diameter and distances required are determined by the material throughput, thus the flow rate and pellet-to-transport fluid ratio, and time required to achieve an appropriate level of cooling and/or solidification of the pellets to avoid undesirable volatilization and/or premature expansion. For example, increasing the piping diameter and/or distance between the pelletizer to the dryer is one mechanism to provide additional cooling to the pellets.

Valving, gauges, or other processing and monitoring equipment should be of sufficient flow and pressure rating as well as of sufficient diameter to avoid undue blockage, obstruction or otherwise alter the process, leading to additional and undesirable pressure generation or process occlusion. The transport fluid and optional additive compositions should be compatible with the components of the pellet formulation and optionally can be readily absorbed into or adsorbed onto the components in that formulation. Excess transport fluid and/or additives should be readily removable from the pellets by such methods as rinsing, aspiration, evaporation, dewatering, solvent removal, filtration, or similar techniques as understood by those skilled in the art.

Surface treatments can be applied to the pelletization equipment used in pelletizing section 6 to reduce abrasion, erosion, corrosion, wear, and undesirable adhesion and stricture. In addition, the pelletization equipment can be nitrided, carbonitrided, metallized by sintering, and/or electrolytically plated. Other surface treatments for improvement of surface properties, enhancement of corrosion and abrasion resistance, improvement of wear, and/or reduction of clumping, agglomeration, and/or stricture also can be used on the pelletization equipment of pelletizing section 6. It should be noted that such coatings also can be applied to the various components of the drying, transportation, and bagging sections of the systems and processes disclosed herein.

After pelletization, the transport medium transports the pellets to dewatering and/or drying section 8. To elaborate briefly, the other types of equipment that can be in dewatering and/or drying section 8 of the systems and processes described herein include one or more of a centrifugal dryer, fluidized bed dryer, tumble dryer, and/or desiccant dryer. This section is designed to provide a controlled level of moisture for materials such as, but not limited to, flakes, globules, spheres, cylinders, or other geometric shapes. This can be achieved by, but is not limited to, filtration, vibratory filtration, centrifugal drying, forced or heated air convection, rotational drying, vacuum drying, or a fluidized bed. Again, for the purposes of this disclosure, reference is made to a centrifugal dryer. An exemplary centrifugal dryer 200 is illustrated in FIG. 2.

Figure 2:
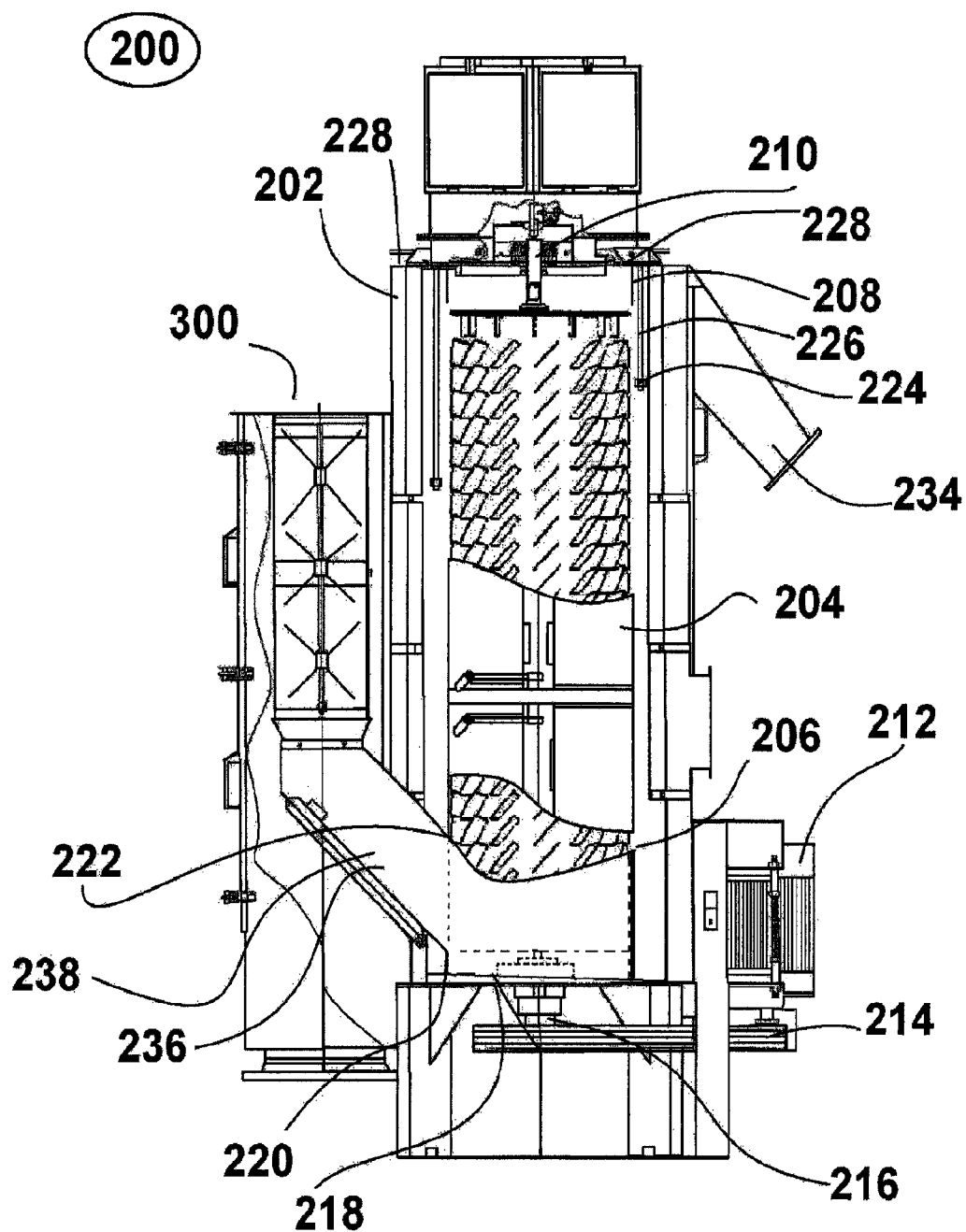
FIG. 2 is a schematic illustration of a centrifugal dryer in accordance with some embodiments of the present invention.
Figure 3:
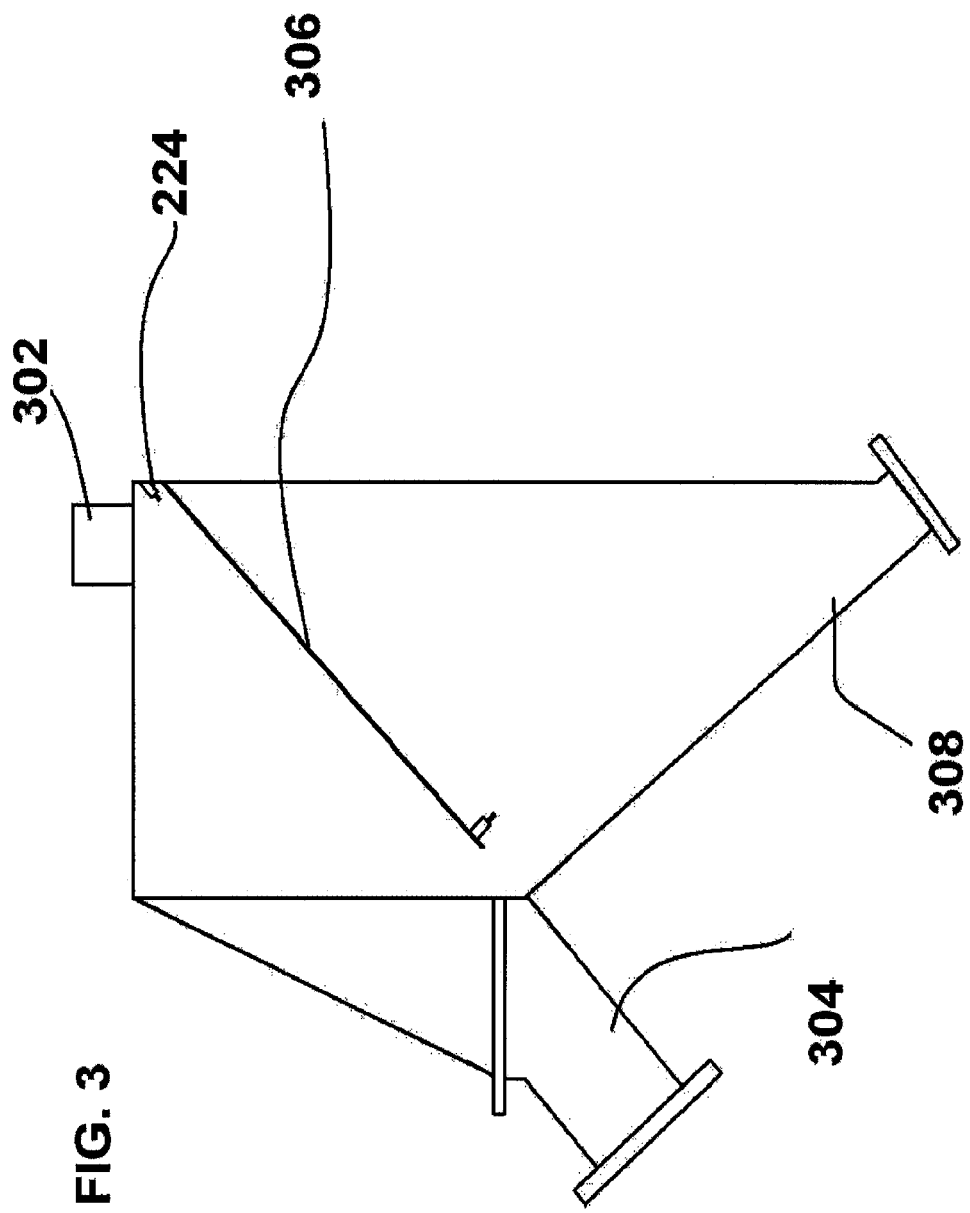
FIG. 3 is a schematic illustration of an agglomerate catcher for the centrifugal dryer of FIG. 2 in accordance with some embodiments of the present invention.
Figure 4:
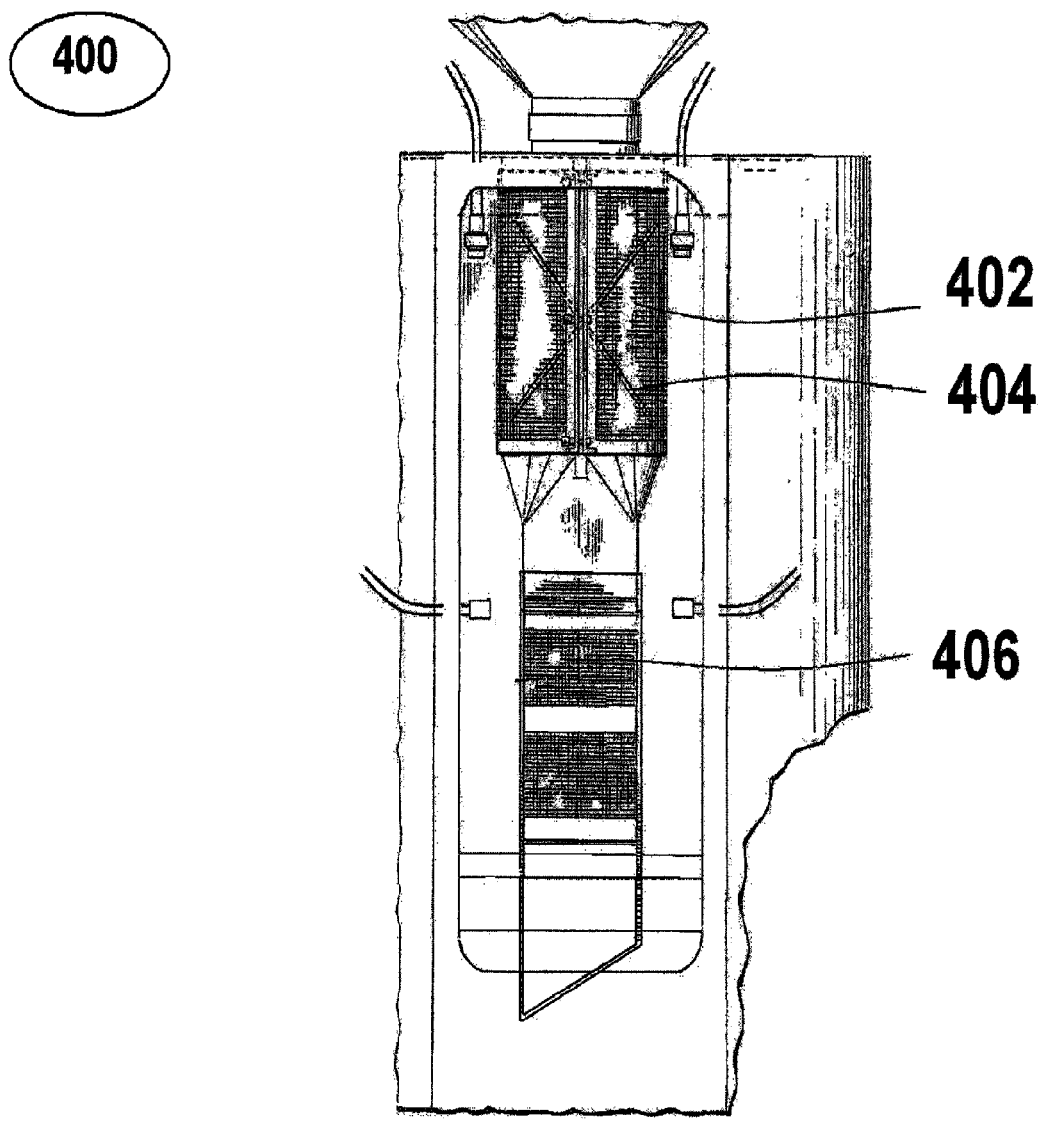
FIG. 4 is a schematic illustration of a vertical dewatering unit for the centrifugal dryer of FIG. 2 in accordance with some embodiments of the present invention.

The underwater pelletizer of section 6, and optionally other upstream processes, are coupled to dryer 200 by way of transportation pipe 302, which is shown in FIG. 3. Transportation pipe 302 can be connected to both pelletization section 6 and agglomerate catcher 300. Agglomerate catcher 300 in FIG. 3 is considered to be part of centrifugal dryer 200 shown in FIG. 2. Transportation pipe 302 discharges the pellets and fluid slurry (or concentrated slurry) into agglomerate catcher 300, which then catches, removes and discharges pellet agglomerates through a discharge chute 304. Agglomerate catcher 300 includes an angled round bar grid, perforated plate, or screen 306 that permits passage of fluid and pellets but collects adhered, clumped, or otherwise agglomerated pellets and directs them toward the discharge chute 304. The pellets and fluid slurry then optionally, but preferably, pass into a dewatering unit 400, which is shown in FIG. 2 but is detailed in FIG. 4, by way of feed chute 308, which is shown in FIG. 3. Dewatering unit 400 includes at least one vertical or horizontal foraminous membrane screen 402 containing one or more baffles 404 and/or an inclined foraminous membrane screen 406 that enables fluid to pass downwardly into a fines removal screen (not shown) and therethrough to a reservoir (not shown). Dewatering unit 400 can be attached to agglomerate catcher 300 in a number of ways, but is preferably fixedly attached to the end of feed chute 308. The pellets are then discharged from dewatering unit 400 into the lower end of the centrifugal dryer 200 by way of pellet inlet chute 236, as shown in FIG. 2.

Pellet inlet chute 236 connects to the end of dewatering unit 400. It can be fixedly attached or detachable. While pellet inlet chute 236 may have any shape (e.g., square, rectangular, triangular, round, elliptical, or the like), it is preferably square-shaped. In addition, the walls 238 of pellet inlet chute 236 can be of solid or perforated construction. Preferably, walls 238 are made partially of solid construction and partially of perforated construction. Most preferably, walls 238 of pellet inlet chute 236 are of solid construction.

As illustrated in FIG. 2, dryer 200 includes, but is not limited to, a generally square-shaped housing 202 having a vertically oriented generally cylindrical screen 204 mounted on a cylindrical screen support 206 at the base of the screen 204, and a cylindrical screen support 208 at the top of the screen. The screen 204 is thus positioned concentrically within the housing 202 in radially spaced relation from the inside wall of the housing.

In some embodiments, a solid screen (e.g., non-perforated sheet metal) (not shown) is also included at the bottom of the dryer 200. A solid screen can provide additional cooling and friction reducing mechanisms for the pellets because it allows for the transport fluid to remain on its surface, thereby providing additional time during which the pellets can remain in contact with the colder transport fluid.

A vertical rotor 210 is mounted for rotation within the screen 204 and is rotatably driven by a motor 212 that can be mounted at and/or connected to the base of the dryer or at the top of the dryer and is preferably mounted at and or connected to the base of dryer 200. The motor 212 is connected to the rotor 210 by a drive pulley 214 and through a bearing 216 connected with the lower end of the housing. The interior dryer bottom 218 supports the rotor 210 and guide the rotational movement of the lower end of the rotor. Pellet inlet chute 236 is in communication with the lower end of the screen 204 and rotor 210 through the lower screen support section 220 at connection 222, and the upper end of the housing and rotor is in communication with pellet exit chute 234, through a connection (not shown) in the upper screen support section 208 at the upper end of the housing.

The optional self-cleaning structure of the dryer 200 includes a plurality of spray nozzles or spray head assemblies 224 supported between the interior of the housing 202 and the exterior of the screen 204 as illustrated in FIG. 2. Spray head assemblies are optionally, but preferably, placed in agglomerate catcher 300 (shown in FIGS. 2 and 3). FIGS. 2 and 3 additionally illustrate an exemplary placement of spray head assembly 224. The spray head assembly 224 of FIG. 2 is supported at the end of spray pipes 226 extending upwardly through top plate 228 at the upper end of the housing with the upper ends (not shown) of the spray pipes 226 being exposed. Hoses or lines (not shown) feed high pressure fluid (e.g., water) at a flow rate of at least approximately 40 gallons per minute (gpm), and preferably about 60 gpm to about 80 gpm, and more preferably at approximately 80 gpm or higher to the spray nozzles 224. The hoses can optionally feed off a single manifold (not shown) mounted on the dryer 200.

Various rotor assemblies and lifter configurations can be used. These include, but are not limited to, segmented rotor assemblies, solid rotor assemblies, and the like.

After the pellets exit centrifugal dryer 200 at its upper end (at pellet exit chute 234) they are sent, via piping, to a diverter valve. Optionally, a diverter valve (not shown) is coupled to pellet exit chute for the purpose of diverting pellets from continuing onward to pellet diverter section 10 and bagging section 12. Should there be problems with machinery in pellet diverter section 10 and/or bagging section 12, should the pelletized material not meet specifications, or should there be any other reason why an operator does not want the pelletized material to continue on to any further processing, the operator can use the diverter valve to divert the pellets from further processing.

Figure 5A:
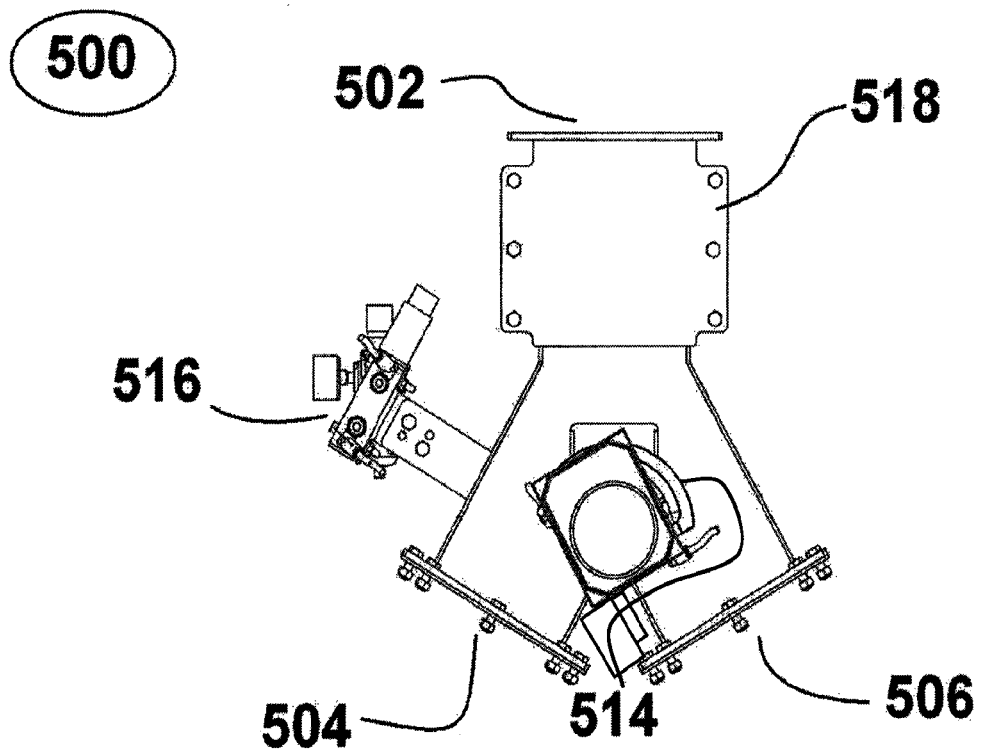
FIG. 5a and FIG. 5c are schematic illustrations of a pellet diverter valve in accordance with some embodiments of the present invention.
Figure 5C:
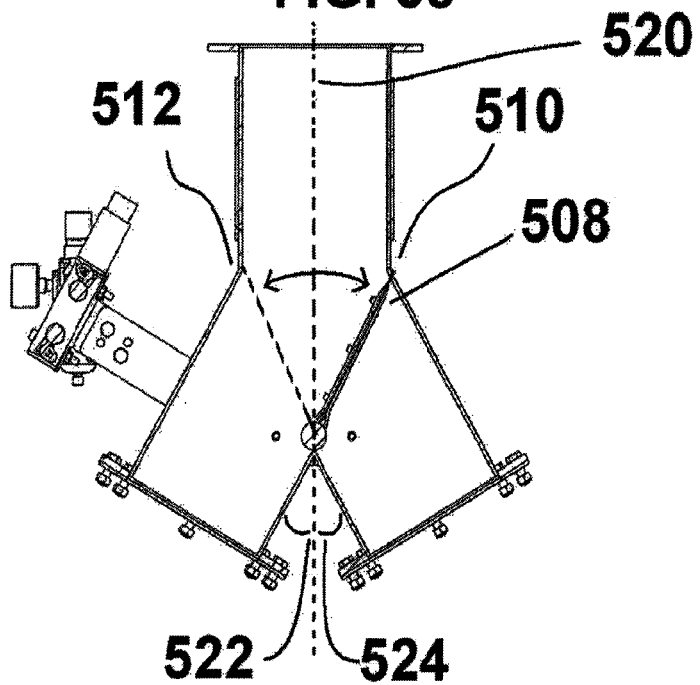
Figure 5B:
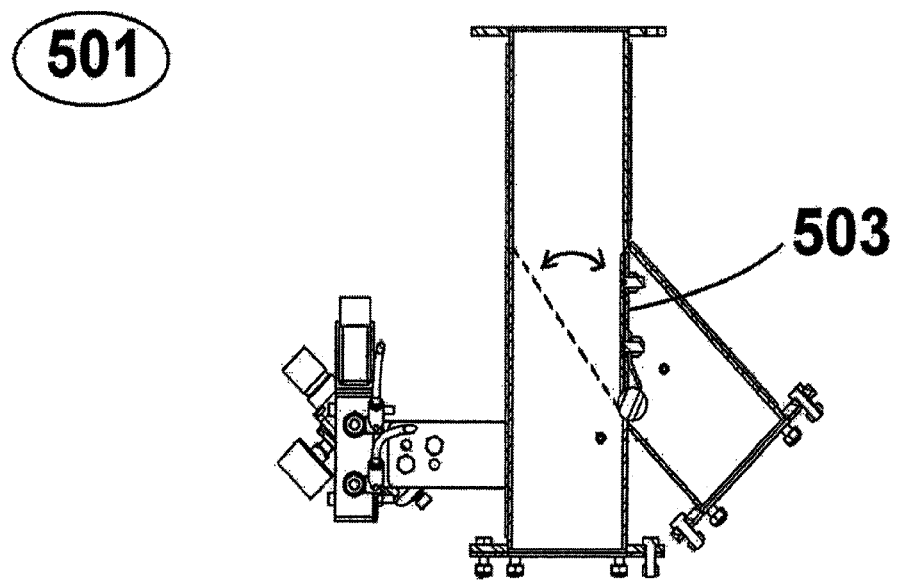
FIG. 5b is a schematic illustration of a prior art pellet diverter valve.

An exemplary pellet diverter valve, in accordance with some embodiments of the present invention, is illustrated in FIGS. 5a and 5c. Pellet diverter valve 500 was developed, in particular, to overcome the many problems associated with pelletizing and drying tacky polymeric materials. By way of comparison, FIG. 5b illustrates a prior art pellet diverter valve 501. When diverting tacky polymer pellets, it was found that the design of prior art pellet diverter valve(s) 501 was not suitable to efficiently and reliably divert pellets during operating conditions, owing to the angle of pellet diverter plate 503 in relation to the incoming pellets.

During operation of prior art pellet diverter valve 501, tacky pellets would hit diverter plate 503 with such velocity as to cause them to adhere and remain to the diverter plate 503. Subsequently, additional tacky pellets would continue to accumulate, causing a back-up in pellet exit chute 234 (shown in FIG. 2) and eventually requiring shut-down of the system.

Referring now to FIGS. 5a and 5c, the pellet diverter valve(s) 500 of the present invention has been designed specifically for operation with tacky polymeric materials. Again, other polymeric materials also can be processed (i.e., diverted) using the pellet diverter valve 500. During operation, pellets enter pellet diverter valve(s) 500 at inlet 502 which is directly coupled or indirectly coupled (i.e., via an intermediate device) to pellet exit chute 234. In exemplary embodiments, pellet diverter valve 500 is detachably connected to pellet exit chute 234 via an extension pipe. When the pellets enter pellet diverter valve 500 they will flow continuously through one of the two pellet diverter valve outlets or exit chutes 504 or 506. The specific outlet through which the pellets will flow depends on the position of diverter flap 508. The position of diverter flap 508 can be controlled by hand or, preferably, by a controller (e.g., a PLC) (not shown).

Movement of diverter flap 508 can be accomplished in a variety of ways including one or more of manually, pneumatically, electronically, automatically, or hydraulically; and the diverter flap 508 can optionally be controlled by a PLC. In exemplary embodiments, diverter flap 508 is controlled by pneumatic actuator 514 that is operated by an electronically controlled solenoid valve 516, which is controlled by a PLC.

In some cases, when a PLC is used to control the pellet diverter valve(s) 500, the solenoid valve(s) can include needle valves (not shown) that can be used to control the diverter flap 508 speed. In controlling the speed of the diverter flap 508, the needle valves minimize the possibility of trapping a pellet between the diverter flap 508 and the interior walls of the pellet diverter valve(s) 500. Furthermore, the needle valves reduce the effects of the impact of the diverter flap 508 against these walls, therefore decreasing wear and increasing the longevity of the pellet divert valve(s) 500.

Wall plate 518 can be detachable, so as to allow easy access to the inner mechanisms of pellet diverter 500. For example, the detachability of wall plate 518 enables operators to inspect, clean, and/or repair any of the inside surfaces of pellet diverter valve(s) 500 with minimum down time. Detachable wall plate 518 can be made from a metal or alloy (e.g., stainless steel). Alternatively, detachable wall plate 518 can be made from a transparent material that will allow an operator to continuously monitor and observe the conditions (e.g., the flow of pellets) within the pellet diverter valve(s) 500. It should be recognized that detachable wall plate 518 can be disposed on any side wall of the pellet diverter valve(s) 500. To further aid an operator in observing the interior of the pellet diverter valve 500, the detachable wall plate 518, or another portion of the inside or outside of pellet diverter valve 500, can be equipped with an optional light source, such as a strobe light, to illuminate the interior of the pellet diverter valve 500 and/or a video camera so as to allow the operator(s) to view the interior of pellet diverter valve 500 to monitor for problems.

It is to be understood that the dimensions of pellet diverter valve 500 can vary based on the capacity of the equipment used in the process, the scale of the particular production run, and other like factors. Further, the pellet diverter valve(s) 500 can be formed from any material that can withstand the conditions to which it will be exposed (e.g., velocity of the pellets impinging on its interior surfaces, temperature of the pellets, and the like). In exemplary embodiments, the pellet diverter valve(s) 500 is formed from stainless steel.

The pellet diverter valve(s) 500 generally can have an inverted "Y" shaped design. This design incorporates an angle of repose that reduces and/or eliminates the problem of pellets accumulating on diverter flap 508. Dotted line 520 runs through the middle of pellet diverter inlet 502 and is the axis upon which the following angles will be based. Angles 522 and 524, independently, can range from about 0° to about 90°, preferably from about 15° to about 60°, more preferably from about 25° to about 45°, and are most preferably about 30°.

To further enhance the effectiveness of pellet diverter valve(s) 500, surface coatings can be applied to all internal surfaces that may come into contact with the pellets to reduce and/or eliminate corrosion, erosion, and/or adherence. Such coatings are described hereinabove. Additional examples of such coatings are provided in commonly-assigned U.S. patent application Ser. No. 11/932,067, which is incorporated herein by reference as if fully set forth below.

In some cases, the pellets may be sufficiently tacky to warrant a powder coating. In other instances a powder coating on the pellets may be desired. Regardless of the motivation, the powder coating can be applied to the pellets upon exiting of the dryer from exit chute 234 and before entry into the pellet diverter valve(s) 500. This can be accomplished by coupling a feeder or feeders (not shown) such as a volumetric and/or gravimetric type feeder that supplies the powder to the exit chute 234 or the piping between exit chute 234 and the diverter valve(s) (not shown). The feeder distributes the powder to the pellets as they traverse the exit chute 234 or the piping between exit chute 234 and the diverter valve (not shown). This pellet diverter valve would most preferably be located immediately after the feeder or feeders.

Upon exiting pellet diverter valve outlet 504 and/or 506, the pellets will undergo a bagging step referenced in FIG. 1 as bagging section 12. Bagging section 12 can incorporate one or more bagging machines to package the pellets. In exemplary embodiments, bagging section 12 employs two separate bagging machines.

It is important to note that more than two bagging machines can be used in the processes and systems disclosed herein. In order to do so, additional outlets would be necessary on the pellet diverter valve. Alternatively, additional pellet diverter valves could be used downstream of the pellet diverter valve described above. For example, a series of three pellet diverter valves can be daisy-chained to produce four outlets for the initial inlet. These four outlets could feed up to four separate bagging machines. In another example, seven pellet diverter valves can be daisy-chained to produce eight outlets for the initial inlet. These eight outlets could feed up to eight separate bagging machines. This daisy-chaining concept can, in theory, be extended infinitely if the volume or production rate of pellets demanded it.

Pellet diverter valve outlets 504 and 506 can have different dimensions if desired. Preferably, they are of the same dimension so that the distance the pellets must travel upon entering pellet diverter valve 500 to a respective bagging machine is the same. In addition, outlets 504 and 506 can be detachably coupled (either directly or indirectly) to their respective bagging machines. In some embodiments, there may be a gap between outlets 504 and 506 and their respective bagging machines where the pellets can free flow from the outlets 504 and 506, through the gap, and into the respective bagging machine.

Figure 6:
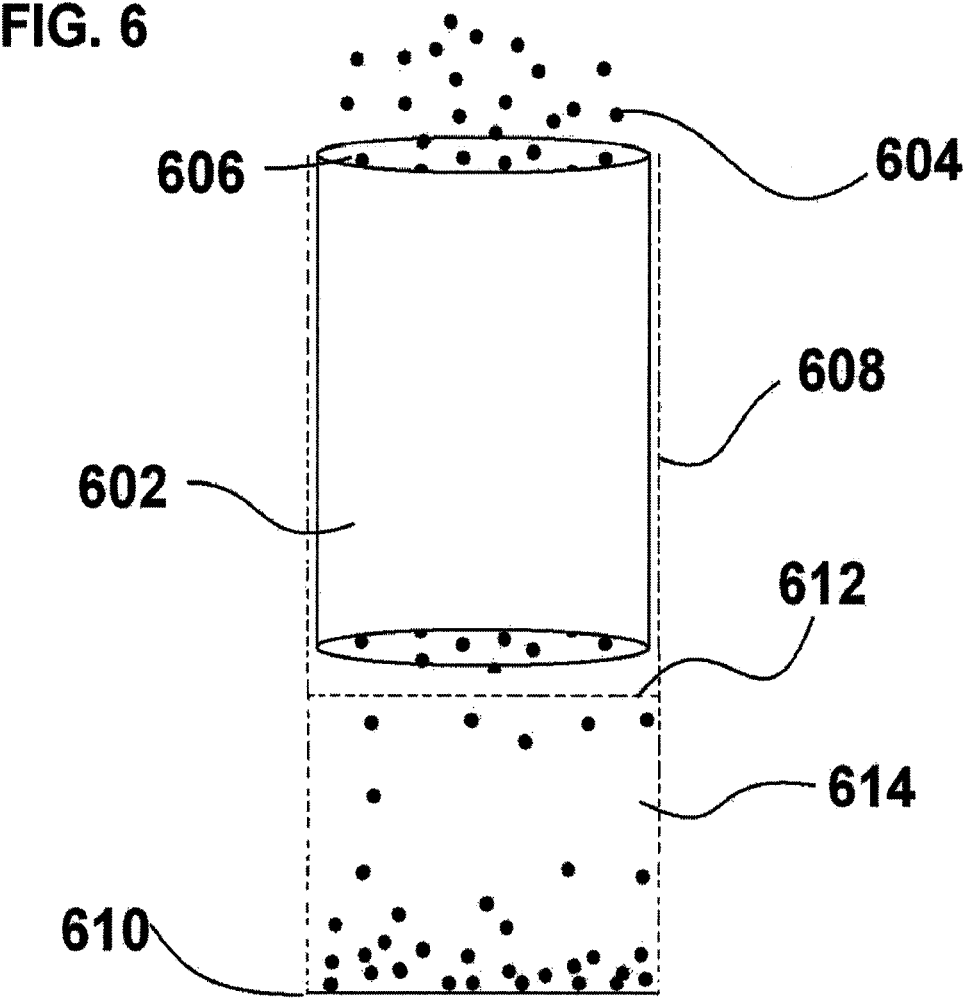
FIG. 6 is a schematic illustration of a bagging portion in accordance with some embodiments of the present invention.

Free flowing from the exit of centrifugal dryer 200, the pellets flow through pellet diverter valve(s) 500 and into a forming tube of a bagging machine. The forming tube, which is shown in FIG. 6 and designated by reference number 602, serves to funnel the pellets into a bag, as well as to hold the bag open for the entry of the pellets. Forming tube 602 can be surface treated to reduce and/or eliminate corrosion, erosion, and/or adherence as described hereinabove for the various other components of the processes and systems of the present invention.

Several factors can determine how much material will flow into pellet diverter 500 and out of pellet diverter valve outlet 504 or 506. These include the production rate of the pellets and the length of time that diverter flap 508 is in position 510 or 512. The length of time that diverter flap 508 stays in position 510 or 512 will depend in part on the amount of pellets desired in a particular bag.

A single PLC (not shown) can control pellet diverter valve(s) 500 and each of the bagging machines (not shown). The PLC can be capable of operating pellet diverter valve(s) 500 so that diverter flap 508 stays in position 510 or 512 for equivalent or different time lengths. To produce bagged material of different sizes, the PLC can allow for diverter flap 508 to stay in either position 510 or 512 longer than the other of position 512 or 510, thus allowing one bagging machine for example to produce one-pound bags while the other bagging machine produces two-pound bags. Similarly, if more than one pellet diverter valve 500 and/or two bagging machines are used, the PLC can control each of these components as well.

Alternatively, one PLC can control each of the components of the processes and systems through the diverter valve(s), while the bagging section 12 has one PLC to control all of the bagging machines. It is also possible for each bagging machine in bagging section 12 to have a separate PLC instead of one PLC for all of the bagging machines. In some situations, separate PLCs can be used in conjunction to control the bagging step of the processes and systems. For example, one PLC can control when individual bags are prepared by the bagging machines, while another PLC can control other parameters of the bagging step (e.g., how large the bag must be, when and how long the seal should be applied, temperature of the seal, and the like).

There can be a wide variance in the size of the final bagged product due to the various options available to the operator as has been described thus far, but also due to an error in reproducibility. That is to say that the filled and sealed bags may vary in weight, weighting more or less than what was desired. To alleviate and offset this error in reproducibility and the effect that it can have on the total weight of a large amount of filled bags, a scale can be, and most preferably is, installed downstream of the bagging units. The scale can be used to confirm the final weight of each bag and/or take the average of one or more bags and relay the information back to the PLC to make adjustments to the timing of the movement of the diverter flap 508. Preferably, the scale will take the average weight of two or more bags and relay the information back to the PLC.

For example, if one desires to produce 50 one-pound bags, yet the average weight of the first three bags in the process is 1.02 pounds each, the scales can relay such information back to the PLC so that it can make an adjustment to diverter flap's 508 timing. In this example the PLC would speed up diverter flap 508 so that the bags would be open to the flow of pellets for less time, decreasing their total amount of pellets provided to the bag and thus arriving at or closer to the desired weight to offset the previous error in weight. The scale used with the present invention optionally has the ability to be programmed to determine which bag came from which bagger. This option allows the scale to relay to the PLC exactly which bagger is producing bags below or above the desired weight.

Optionally, the PLC will automatically trigger an alarm system to alert the operator(s) when adjustments are being made to offset the error in reproducibility yet are not correcting the error.

In addition, the bagging machines optionally can be equipped with the vacuum capabilities to evacuate air from the bags. The vacuum capability allows removal of countercurrent air so as to gently remove air from the bags after the pellets have been placed inside, but before the bag is sealed, and to remove undesirable materials such as excess powder, moisture, dust, and other fragments.

Excess powder, dust, and other fragments can collect on the interior and exterior surfaces of the bags, and can create problems during sealing. The vacuum can be pulled from various locations in bagging section 12. Most preferably the vacuum is pulled from under the forming collar 701 out of forming tube 602 (shown in FIG. 7), therefore drawing countercurrent air from the forming tube. The amount of vacuum pulled is adjustable and the timing of such is optionally adjustable or continuous. When powder applications are involved, a vacuum will most preferably be used continuously. The double walled construction illustrated in FIG. 7 of forming tube 602 aids in dissipating heat given off from the sealing mechanisms and acts as a thermal barrier to minimize condensation build-up.

Interior walls 704 are most preferably coated to prevent adherence, corrosion, and abrasion since they come into contact with the pelletized materials. The vacuum capabilities previously mentioned also benefit from the double walled construction of forming tube 602. The exterior walls of the forming tube 602 are designated by number 706. The inlet/outlet port 708 of forming tube 602 can be located at various positions along the exterior wall 706 of forming tube 602 and is most preferably located in the upper region of forming tube 602. It is possible to vacuum air and/or particles from forming tube 602 (indicated by the arrow in FIG. 7), but also to blow air into forming tube 602 (indicated by an arrow). This may be desirable when the pellets begin to adhere to each other, to the equipment, or when cooling of pelletized material and/or equipment is desired.

Prior to the film being formed into a bag, the film optionally can be perforated. By creating small perforations in the film, air and moisture can escape the bag. This feature is of great importance as the presence of even a small amount of moisture in the bag can be problematic in later processing of the pellet (e.g., during the melting of the bagged material in a melting pot). The film may be perforated at any time, but is preferably perforated just before it passes over forming collar 701. The number of perforations on each bag can vary. Generally speaking, the larger the bag the more perforations are desired. For example, in certain exemplary embodiments, there are about 64 perforations for every about 9.25 inches of film. Thus a one-pound bag that measures about 9.25 inches in length would have about 64 perforations.

The size of the perforations can be of various diameters, but are preferably less than about 0.04 inches, and most preferably less than about 0.024 inches in diameter. The film can be perforated in various ways known to those skilled in the art. For example, the film can be perforated by a roller containing a plurality of sharp points that perforate the film as the film rolls across rollers and makes its way from the roll of film to forming collar 701.

FIG. 6 illustrates a portion of the bagging machine(s) of bagging section 12. The bagging machine can be any type of bagging machine known to those skilled in the art to which this disclosure pertains. In exemplary embodiments, the bagging machine is a so-called "vertical form, fill, and seal" bagging machine.

With pellets 604 falling downwardly through forming tube inlet 606, pellets continuously fall into a suitable bagging material 608 that is placed around and below the forming tube 602. Solid line 610 represents the bottom of bagging material 608, which is created by a suitable horizontal sealing mechanism (not shown). The seal 610 can be created using any known sealing means, but is preferably created by fusing the bagging material 608 unto itself with a horizontal heating element.

Dotted line 612 represents the top of bag 614, and what will be the bottom of a subsequent bag in the production process. The seal at dotted line 612 can be created by the same process described above for solid line 610.

The bagging material 608 can be of any material that is suitable for holding the pellets. It is preferably made of a composition that is capable of being melted with the pellets and blendable into the melted pellet composition, such as those commercially available under the names Petrothane 421 and Lacquene. The composition and thickness of bagging material 608 is chosen so as not to adversely affect the desired properties of the composition of the pellets when blended into same. The melting temperature of the bagging material 608 should be sufficiently close to, and preferably below, that of the composition of the pellets. Otherwise, when the pellets are melted, the bagging material 608 will coagulate and could float and/or cause blockages in application equipment. In some cases, the thickness of the bagging material 608 can be about 12.0 mil (i.e., one mil is equal to 0.001 inches and 0.025 millimeters) to about 0.5 mil, preferably from about 6.0 mil to about 0.7 mil, more preferably from about 4.5 mil to about 0.75 mil, and most preferably from about 2.0 mil to about 0.8 mil, so as to minimize the amount of bagging material 608 in the total blend or melted composition (comprising the bagging material and the pellets). The formulation of the bagging material 608 can include various additives (e.g., anti-foaming agents, anti-oxidants, stabilizers, and the like) in its formulation so as to facilitate and enhance the processing of the blend or melted composition.

Additional details regarding these properties, and others, of the bagging material 608 in relation to that of the pellets are described in Reissued U.S. Pat. No. 36,177, which is incorporated herein by reference in its entirety as if fully set forth below. In addition, difficulties can arise with the use of such thin films and one must take into consideration the optimum amount of heat to use to seal the film and form the bags. If too much heat is used, the film can burn and a sufficient seal will not be formed. If too little heat is used, a sufficient seal will not be formed. By way of example, it has been found that a 1 mil film can be properly sealed without burning at about 270 degrees Fahrenheit.

It should be noted, however, that there are benefits to the use of very thin films. By reducing the overall amount of film that must be used, costs can be reduced. Additionally, in situations where the film is melted with the pellets, when thinner films are used, less film will eventually be melted and blended with the material composition, thus reducing coagulates, impurities, and the chances of foaming or other undesirable reactions.

What is claimed is:

1. A system for continuously bagging a tacky and/or polymer-containing formulation, the system comprising:
    a feeding section configured to receive a tacky and/or polymer-containing formulation;
    a mixing section configured to receive the tacky and/or polymer-containing formulation from the feeding section and mix, melt, and/or blend the tacky and/or polymer-containing formulation;
    a pelletizing section configured to receive the tacky and/or polymer-containing formulation from the mixing section and pelletize the tacky and/or polymer-containing formulation;
    a drying section configured to receive the tacky and/or polymer-containing formulation from the pelletizing section and dry the pelletized tacky and/or polymer-containing formulation;
    a pellet diverter valve, with a first position and a second position, to continuously route an incoming flow of pellets comprising:
        an inlet configured to receive the incoming flow of pellets from the drying section; and
        at least a first and second outlet to continuously dispense an outgoing flow of pellets;
    a controller, in communication with the pellet diverter valve, configured to calculate or receive a first predetermined time interval; and
    at least a first and second bagging assembly in communication with at least the first and second outlets, respectively, of the pellet diverter valve, wherein the at least the first and second bagging assemblies alternatingly receive a predetermined quantity of pellets from the pellet diverter valve to allow continuous bagging of the pellets;
    wherein the controller signals the pellet diverter valve to move from the first position to the second position based on the first predetermined time interval.

2. The system for continuously a bagging tacky and/or polymer-containing formulation in claim 1, wherein the at least the first and second bagging assemblies each comprise:
    a vertical forming tube having an input configured to receive an incoming flow of pellets and an output configured to dispense an outgoing flow of pellets;
    a bagging material placed around and below the forming tube, wherein the bagging material is configured to collect the specific quantity of pellets; and
    a horizontal sealing mechanism configured to seal the bagging material into individual bags for containing the specific quantity of pellets.

3. The system for continuously bagging a tacky and/or polymer-containing formulation in claim 2, wherein the horizontal sealing mechanism seals the bagging material using constant heat.

4. The system for continuously bagging a tacky and/or polymer-containing formulation in claim 2, wherein the horizontal sealing mechanism seals the bagging material using impulse heat.

5. The system for continuously bagging a tacky and/or polymer-containing formulation in claim 2, wherein the horizontal sealing mechanism seals the bagging material using constant and impulse heat.

6. The system for continuously bagging a tacky and/or polymer-containing formulation of claim 1, wherein the tacky and/or polymer-containing formulation is a tacky polymeric formulation.

7. The system for continuously bagging a tacky and/or polymer-containing formulation of claim 6, wherein the tacky polymeric formulation is a hot melt adhesive, a pressure sensitive adhesive, a hot melt pressure sensitive adhesive, or asphalt.

8. The system for continuously bagging a tacky and/or polymer-containing formulation of claim 6, further comprising an internal surface coating disposed on one or more surfaces of the feeding section, mixing section, pelletizing section, drying section, pellet diverter valve, or bagging assemblies that come into contact with the tacky polymeric formulation, wherein the internal surface coating reduces corrosion, erosion, and/or adherence of the tacky polymeric formulation to the one or more surfaces.

9. The system for continuously bagging a tacky and/or polymer-containing formulation in claim 1, further comprising a blower to blow air into the first and/or second bagging assemblies.

10. The system of claim 1, wherein the controller calculates or receives a second predetermined time interval, and wherein the controller signals the pellet diverter valve to move from the second position to the first position based on the second predetermined time interval.

11. The system of claim 1, wherein the controller calculates the first predetermined time interval using the production rate of the pellets.

12. The system of claim 1, wherein the controller calculates the first predetermined time interval using a first and second bag size associated with the first and second bagging assemblies.

13. A method for continuously bagging a tacky and/or polymer-containing formulation, the method comprising:
    feeding a tacky and/or polymer-containing formulation into a feeding section;
    mixing, melting, and/or blending the tacky and/or polymer-containing formulation in a mixing section;
    pelletizing the mixed, melted, and/or blended tacky and/or polymer-containing formulation in a pelletizing section;
    drying pellets of the tacky and/or polymer-containing formulation in a drying section;
    continuously diverting a specific quantity of the pellets through one of at least a first and second outlet of a pellet diverter valve based on a predetermined time interval that results in diverting the specific quantity of pellets; and
    continuously collecting the specific quantity of pellets in a bag using a bagging assembly, wherein the bagging assembly is located at the first outlet, second outlet, or both of the pellet diverter valve.

14. The method for continuously bagging a tacky and/or polymer-containing formulation in claim 13, wherein the bagging assembly comprises:
    a vertical forming tube having an input configured to receive the specific quantity of pellets and an output configured to dispense the specific quantity of pellets;
    a bagging material placed around and below the forming tube wherein the bagging material is configured to collect the specific quantity of pellets; and
    a horizontal sealing mechanism configured to seal the bagging material into individual bags for containing the specific quantity of pellets.

15. The method for continuously bagging a tacky and/or polymer-containing formulation in claim 14, wherein a melting temperature of the bagging material is less than or equal to about a melting temperature of the pellets.

16. The method for continuously bagging a tacky and/or polymer-containing formulation in claim 14, further comprising removing the individual bags from the bagging assembly using a cutting element.

17. The method for continuously bagging a tacky and/or polymer-containing formulation in claim 14, wherein the horizontal sealing mechanism seals the bagging material using constant heat.

18. The method for continuously bagging a tacky and/or polymer-containing formulation in claim 14, wherein the horizontal sealing mechanism seals the bagging material using impulse heat.

19. The method for continuously bagging a tacky and/or polymer-containing formulation in claim 14, wherein the horizontal sealing mechanism seals the bagging material using constant and impulse heat.

20. The method for continuously bagging a tacky and/or polymer-containing formulation in claim 13, further comprising controlling the specific quantity of pellets using a programmable logic controller in electrical communication with at least one of the pellet diverter valves or the bagging assembly.

21. The method for continuously bagging a tacky and/or polymer-containing formulation in claim 13, wherein the tacky and/or polymer-containing formulation is a tacky polymeric formulation.

22. The method for continuously bagging a tacky and/or polymer-containing formulation in claim 21, wherein the tacky polymeric formulation is a hot melt adhesive, a pressure sensitive adhesive, a hot melt pressure sensitive adhesive, or asphalt.

23. The method for continuously bagging a tacky and/or polymer-containing formulation in claim 21, further comprising applying a powder coating to the pellets of the tacky and/or polymer-containing formulation after the drying.

24. The method for continuously bagging a tacky and/or polymer-containing formulation in claim 13, further comprising applying a vacuum to the bag to remove air or undesirable materials from the bag.

25. The method for continuously bagging a tacky and/or polymer-containing formulation in claim 13, further comprising perforating the bag.

26. The method for continuously bagging a tacky and/or polymer-containing formulation in claim 13, further comprising blowing air into the bagging assembly.

* * * * *